United States Patent [19]

Crotty, III et al.

[11] Patent Number: 5,697,140
[45] Date of Patent: Dec. 16, 1997

[54] METHOD OF ATTACHING A SUNSHADE TO A VEHICLE

[75] Inventors: Willard E. Crotty, III, Quincy, Mich.; Jeffrey L. Beaver, Indianapolis, Ind.

[73] Assignee: Crotty Corporation, Quincy, Mich.

[21] Appl. No.: 553,109

[22] Filed: Nov. 3, 1995

Related U.S. Application Data

[62] Division of Ser. No. 350,409, Dec. 6, 1994, Pat. No. 5,499,854.

[51] Int. Cl.⁶ .................................................... B29C 65/58
[52] U.S. Cl. .................................................. 29/453; 29/434
[58] Field of Search ........................... 29/434, 453, 897.2; 296/97.6, 97.8, 97.9, 97.12, 97.13; 411/45, 46, 48, 60, 41

[56] References Cited

U.S. PATENT DOCUMENTS

| | | |
|---|---|---|
| 2,357,974 | 9/1944 | Roberts . |
| 3,017,217 | 1/1962 | Keating . |
| 4,178,035 | 12/1979 | Cziptschirsch . |
| 4,352,518 | 10/1982 | Prince . |
| 4,377,020 | 3/1983 | Vigo . |
| 4,521,046 | 6/1985 | Foggini . |
| 4,529,157 | 7/1985 | Suman . |
| 4,553,797 | 11/1985 | Marcus . |
| 4,569,552 | 2/1986 | Marks . |
| 4,634,196 | 1/1987 | Nestell . |
| 4,729,590 | 3/1988 | Adams . |
| 4,756,570 | 7/1988 | Cooper . |
| 4,893,866 | 1/1990 | Dowd . |
| 4,902,068 | 2/1990 | Dowd . |
| 4,913,484 | 4/1990 | Dowd . |
| 4,989,911 | 2/1991 | Van Order . |
| 5,031,954 | 7/1991 | Peterson . |
| 5,061,005 | 10/1991 | Van Order . |
| 5,062,608 | 11/1991 | Phelps . |
| 5,082,322 | 1/1992 | Cekander . |
| 5,098,151 | 3/1992 | Peterson . |
| 5,201,564 | 4/1993 | Price . |
| 5,242,204 | 9/1993 | Kitterman . |
| 5,269,060 | 12/1993 | Dowd et al. ........................... 29/453 X |
| 5,544,927 | 8/1996 | Snyder ................................... 296/97.9 |

FOREIGN PATENT DOCUMENTS 1251479  10/1971  United Kingdom .

*Primary Examiner*—S. Thomas Hughes
*Attorney, Agent, or Firm*—Baker & Daniels

[57] ABSTRACT

A sunshade mounting bracket assembly for mounting a sunshade to a vehicle without the use of tools or fasteners. The bracket assembly includes an outer bracket, an inner bracket, and an elbow to which the sunshade is attached. The outer bracket is mountable to an apertured panel such as the sheet metal interior roof of the vehicle. The inner bracket includes resilient locking prongs which define an interior hollow into which the elbow is inserted. The resilient locking prongs are structured to be insertable into an opening in the outer bracket. After their insertion into the outer bracket, the prongs engage the outer bracket when the inner bracket is axially rotated relative to the outer bracket from a first rotational orientation to a second rotational orientation for use. During their engagement with the outer bracket, the prongs are compressed radially inward to compress the elbow maintained within the hollow, which results in rotation of the elbow relative to the inner bracket being frictionally resisted. A method of installing the bracket assembly to a vehicle is also disclosed.

6 Claims, 7 Drawing Sheets

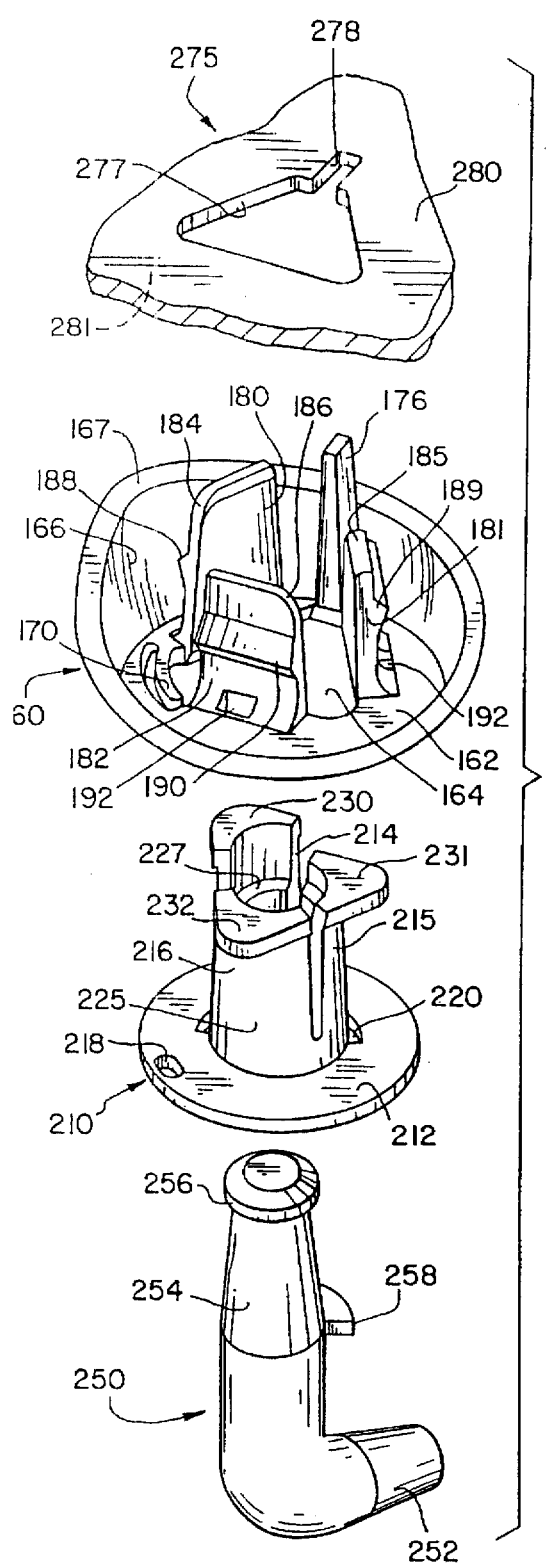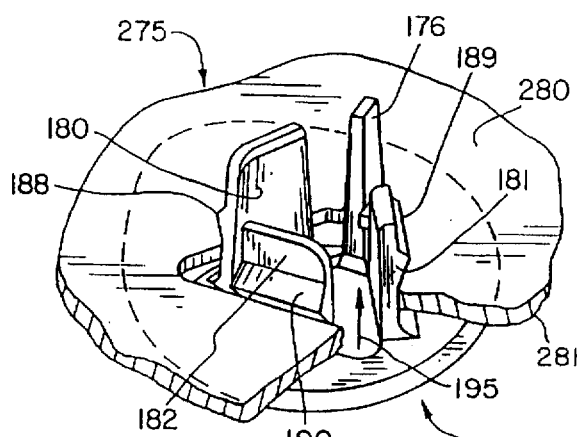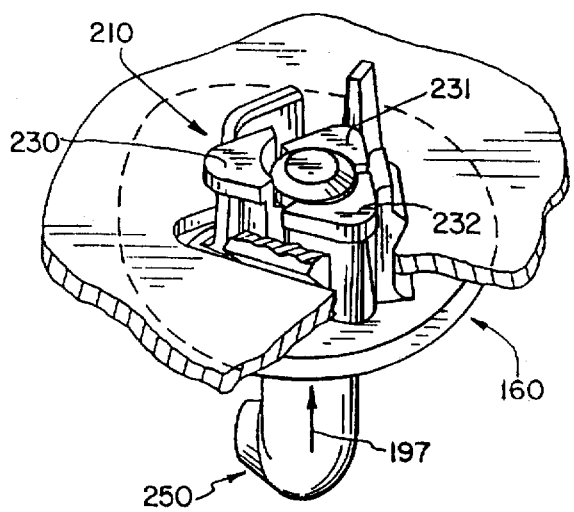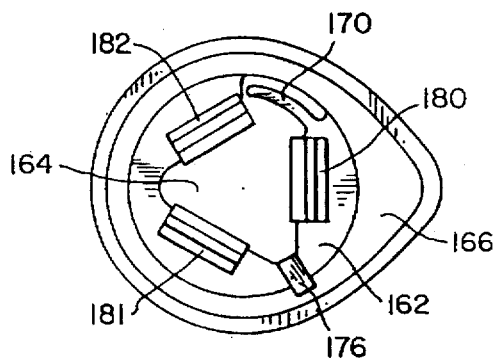

METHOD OF ATTACHING A SUNSHADE TO A VEHICLE

This is a division of application Ser. No. 08/350,409, filed Dec. 6, 1994, now U.S. Pat. No. 5,499,854.

BACKGROUND OF THE INVENTION

The present invention relates generally to sunshades for vehicles, and, in particular, to a mounting bracket assembly that allows the sunshade to be installed in a vehicle without the use of tools or fasteners.

Sunshades for vehicles are typically mounted on the vehicle body roof by a bracket assembly that provides both a horizontal axis about which a visor blade pivots between a storage position adjacent the vehicle headliner and a use position adjacent the windshield, and a generally vertical axis about which the visor pivots between a forward windshield position and a side window position. The need to use fasteners and tools, either powered or hand driven, in the installation into vehicles of many existing sunshade mounting bracket assemblies is undesirable for a number of reasons. For example, in addition to diminishing the aesthetics of the finished product, fasteners may be more labor intensive to install and therefore expensive to employ. Fasteners may also be costly as well as potentially damaging to the vehicle.

A variety of sunshade mounting bracket assemblies have been developed, such as those disclosed in U.S. Pat. No. 5,062,608 and U.S. Pat. No. 5,242,204, which substantially dispense with the need for tools and fasteners in installation. However, while perhaps facilitating installation in some respects, these assemblies are not without their shortcomings.

For example, shortcomings with existing designs pertain to the effort or torque required to swing the sunshade between a windshield covering position and a side window covering position. The required rotational effort is typically a function of the frictional resistance between the bracket assembly elbow and the remainder of the mounting bracket assembly. Prior art attempts to control this effort have taken numerous forms. As disclosed in U.S. Pat. No. 5,242,204, springs have previously been used to try and force mating parts together to provide an adequate frictional engagement therebetween. However, the use of springs may increase the expense of the component parts and complicate the assembly of the parts.

Other designs, such as in U.S. Pat. No. 5,031,954, utilize an interference fit between an elbow or bracket arm and a bracket, wherein the elbow is held within the bracket by an engagement of an elbow head by tangs of the bracket.

It is desirable to provide a visor mounting bracket assembly having a desired rotational effort that does not require springs to produce the effort and which can provide a substantial effort without hindering installation.

SUMMARY OF THE INVENTION

The present invention provides a visor mounting bracket assembly which can be readily installed to a vehicle in a secure manner without the use of fasteners or powered or hand driven tools. The inventive bracket assembly utilizes an inner bracket with locking prongs that are bent inwardly during bracket installation to compress the bracket elbow, which is connected to the visor blade, so as to produce a significant rotational effort in a manner which does not hamper the installation process.

In one form thereof, the present invention provides a sunshade mounting bracket assembly for mounting a sunshade to an apertured panel. The bracket assembly includes an outer bracket, an inner bracket, and an elbow. The outer bracket is mountable to the apertured panel and includes an inner bracket receiving opening. The elbow is connectable with the sunshade. The inner bracket includes a plurality of resilient locking prongs defining an elbow receiving interior hollow, and the prongs are insertable into the inner bracket receiving opening. The resilient locking prongs, after their insertion into the receiving opening, are engagable with a portion of the outer bracket and are compressible radially inwardly thereby when the inner bracket axially rotates relative to the outer bracket from a first rotational orientation to a second rotational orientation for use. The elbow, when disposed within the interior hollow during radial compression of the locking prongs, is compressed between the locking prongs such that rotation of the elbow relative to the inner bracket is frictionally resisted.

In another form thereof, the present invention provides a toolless sunshade mounting bracket assembly for use with a panel. The bracket assembly includes an outer bracket, an inner bracket, and an elbow. The outer bracket includes a plurality of resilient locking fingers and an inner bracket receiving opening. The locking fingers are insertable into a common aperture in the panel and latchable with the panel for mounting the outer bracket to the panel. The elbow is connectable with the sunshade. Preferably, the elbow comprises a molded plastic integral with the metal visor arm. The inner bracket includes a plurality of resilient locking prongs which define an elbow receiving interior hollow. The elbow, when positioned within the interior hollow, is rotatable relative to the inner bracket about a first axis. The resilient locking prongs, when disposed at a first rotational orientation relative to the outer bracket, are insertable into the inner bracket receiving opening. After their insertion into the opening, the prongs are engagable with a portion of the outer bracket and are thereby compressible inwardly in a direction generally transverse to the first axis when the inner bracket is rotated relative to the outer bracket to a second rotational orientation for use. The elbow, when disposed within the interior hollow during the compression of the locking prongs, is compressed between the locking prongs such that rotation of the elbow relative to the inner bracket is frictionally resisted.

In still another form thereof, the invention provides a method of attaching a sunshade to a vehicle. An apertured panel is provided, and a mounting bracket assembly is provided including an outer bracket, an inner bracket, and an elbow connectable with the sunshade. The outer bracket includes means for attachment to the apertured panel and an inner bracket receiving opening. The inner bracket includes a plurality of resilient locking prongs defining at least a portion of an elbow receiving interior hollow. The method further includes the steps of attaching the outer bracket to the apertured panel, inserting the elbow into the elbow receiving interior hollow, and inserting the resilient locking prongs into the inner bracket receiving opening of the attached outer bracket. After prong insertion into the receiving opening, the method also includes the step of axially rotating the resilient locking prongs relative to the outer bracket from a first rotational orientation to a second rotational orientation, wherein during rotation the resilient locking prongs engage a portion of the outer bracket to be compressed radially inwardly thereby so as to compress the elbow between the prongs such that rotation of the elbow relative to the inner bracket is frictionally resisted.

One advantage of the present invention is that a sunshade mounting bracket assembly can be securely installed, without tools or fasteners, in a convenient manner that will expedite assembly.

Another advantage of the present invention is that the elbow of the bracket assembly on which the visor is mounted is automatically compressed within the bracket during installation such that installation by the manufacturer achieves a desired rotational effort.

Another advantage of the present invention is that the sunshade mounting bracket assembly can be installed in a manner that reduces the likelihood of damage to the vehicle, such as paint chips, and which reduces the likelihood of the cracking of the bracket assembly by eliminating screws and thus the possibility of over torquing the screws.

Another advantage of the present invention is that the engagement of the mounting bracket with the sheet metal roof of the vehicle only requires provision of a single aperture in the roof.

Still another advantage of the present invention is that the latching type engagement of the bracket with the sheet metal roof serves as a tactile indicator of the completion of bracket installation as well as does not risk damage potentially caused by excessive torquing of screws during assembly.

Still another advantage of the present invention is that the compressing of the elbow within the bracket assembly provides a stable bracket assembly which is not likely to have its rotational effort adversely affected by vibrations experienced during use.

Another advantage of the present invention is that the mounting bracket is automatically designed to achieve optimal installation in contrast to other types of mounting brackets, which rely on the use of torquing screws to achieve proper installation.

BRIEF DESCRIPTION OF THE DRAWINGS

The above-mentioned and other advantages and objects of this invention, and the manner of attaining them, will become more apparent and the invention itself will be better understood by reference to the following description of embodiments of the invention taken in conjunction with the accompanying drawings, wherein:

FIG. 9 is an exploded perspective view of the outer bracket member, the inner bracket member and the elbow of an alternate embodiment of a visor mounting bracket assembly of the present invention, and wherein a differently configured apertured panel to which the assembly may be operationally installed is diagrammatically shown;

FIG. 10 is a top view of the outer bracket member of the bracket assembly of FIG. 9;

FIGS. 13A–13C are a series of partial sectional perspective views of the bracket assembly of FIG. 9 during its installation to the apertured panel;

Figure 1:
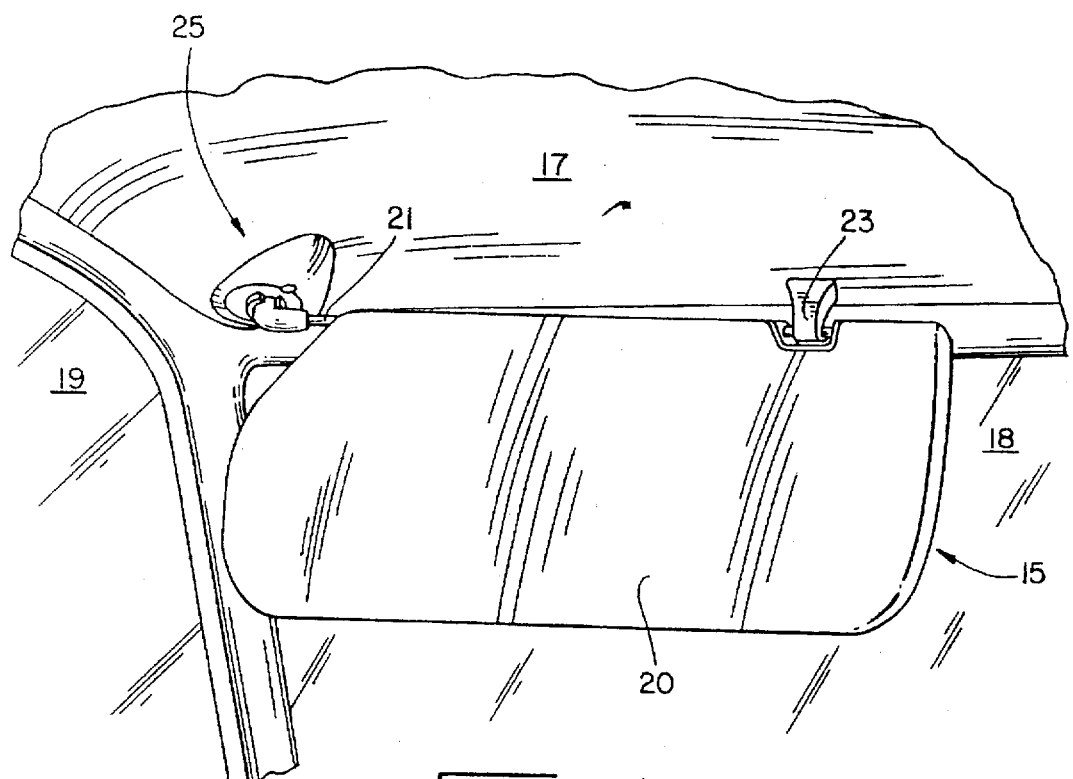
FIG. 1 is a diagrammatic view of a sunshade or visor shown operationally installed in a vehicle via a visor mounting bracket assembly of the present invention.

Corresponding reference characters indicate corresponding parts throughout the several views. Although the drawings represent embodiments of the invention, the drawings are not necessarily to scale and certain features may be exaggerated in order to better illustrate and explain the present invention.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may understand their teachings.

Referring now to FIG. 1, there is shown a visor mounting bracket assembly of the present invention, generally designated 25, employed to install a sunshade or visor, generally designated 15, to the hidden sheet metal roof interior panel of a vehicle. The roof is covered by headliner 17, which may include as is conventional an exposed cushioned fabric material colored to complement the decor of the vehicle. Visor mounting bracket assembly 25 permits sunshade 15 to be horizontally pivoted from the shown position proximate vehicle windshield 18 to a position proximate vehicle side window 19. As is conventional in the art, visor blade 20 is rotatably supported on visor shaft 21 extending from visor mounting bracket assembly 25, and can be coupled to support hook 23. The shown construction of the sunshade is not material to the present invention, as visor mounting bracket assembly 25 can be utilized with various styles of sunshades, including those with electrical circuitry providing for illumination of furnished vanity mirrors.

Figure 2:
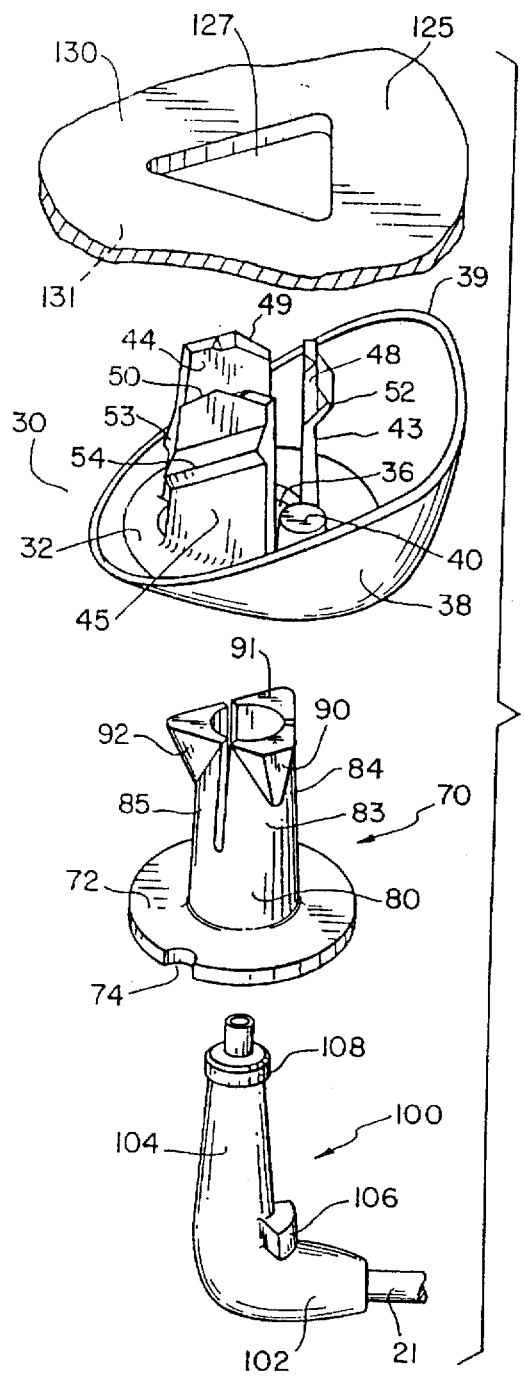
FIG. 2 is an exploded perspective view of the outer bracket member, the inner bracket member and the elbow of the assembly of FIG. 1, and wherein the apertured vehicle panel to which the assembly is operationally installed is diagrammatically show.
Figure 3A:
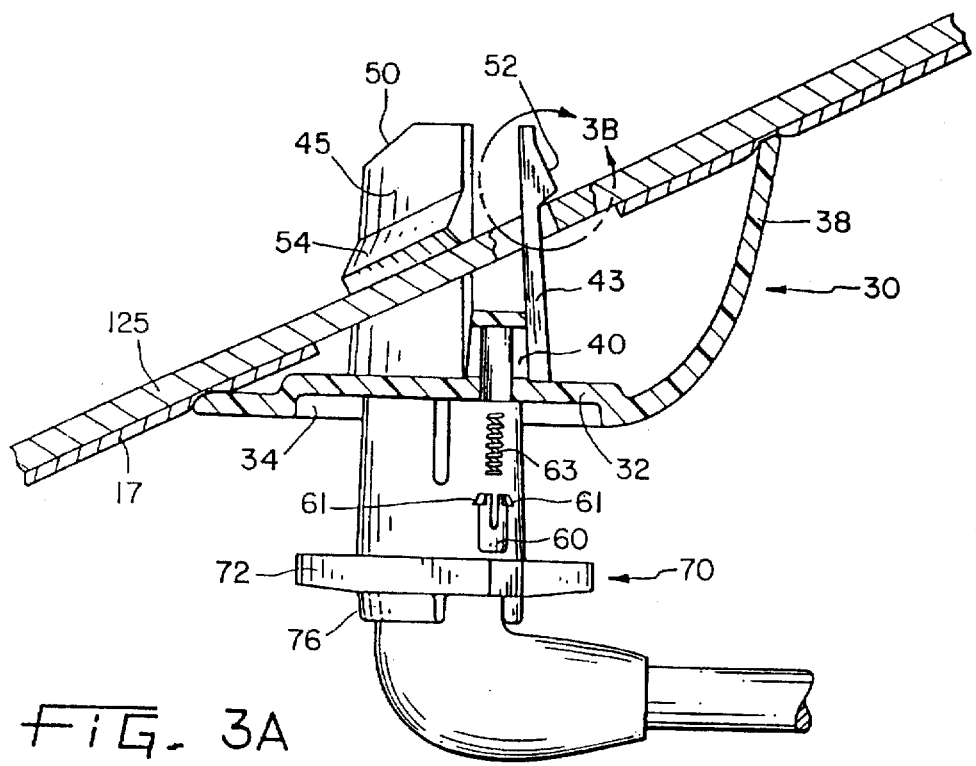
FIG. 3A is a partial cross-sectional side view of the visor mounting bracket assembly of FIG. 2 shown installed to an apertured vehicle panel comprised of the vehicle headliner and sheet metal roof, wherein the visor mounting bracket assembly is shown in a partially unassembled state.

As shown in the embodiment illustrated in the substantially exploded view of FIG. 2, visor mounting bracket assembly 25 basically includes an outer bracket member 30, an inner bracket member 70, and an elbow 100. Visor mounting bracket assembly 25 is installed to an apertured panel 125 including an outer surface 130 and an inner surface 131. Panel 125 includes a keyed aperture 127, which in this embodiment is shaped as an isosceles triangle, for purposes of ensuring a proper insertion alignment of outer bracket member 30. Alternate shapes of aperture 127 may be employed provided corresponding changes to outer bracket member 30 occur to allow connection therewith. As described further herein, panel 125 represents the vehicle interior roof made of sheet metal. While the headliner 17 covering underside surface 131 of panel 125 is not shown in FIG. 2, as shown in FIG. 3A headliner 17 is pressed between outer bracket member 30 and panel 125 when outer bracket member 30 is installed. Due to its clamping engagement with headliner 17, outer bracket member 30 can be employed to assist in mounting headliner 17 directly to the vehicle, thereby facilitating assembly. It will also be appreciated that for off-line installations of the assembly to some modular headliners, a rigid backing plate having a keyed aperture will serve as the apertured panel 125. The back plate and outer bracket would loosely hold the headliner therebetween until a later stage of assembly when the outer bracket would also be attached to an appropriately apertured sheet metal roof, thereby sandwiching the back plate and headliner tightly therebetween.

Figure 4:
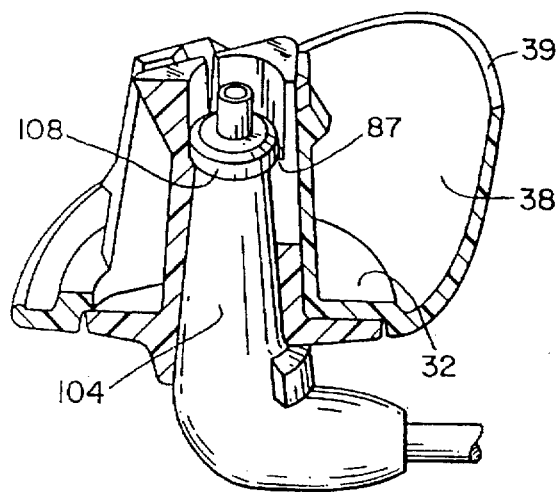
FIG. 4 is a partial cross-sectional perspective view of the visor mounting bracket assembly of FIG. 1 during assembly at a stage prior to the inner bracket member and outer bracket member being finally secured together.
Figure 5:
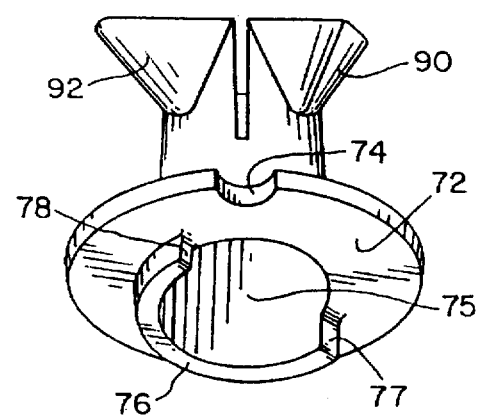
FIG. 5 is a bottom perspective view of the inner bracket member of the assembly of FIG. 1.
Figure 3B:
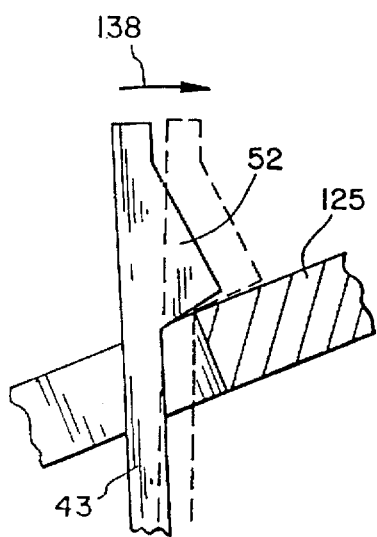
FIG. 3B is an enlarged view of the encircled region referenced as 3B in FIG. 3A showing the snap engagement of a mounting bracket locking finger with the vehicle roof.

Referring now to FIGS. 2–4, outer bracket member 30 is preferably molded in one-piece from a suitable plastic material such as ABS or Acetal. Outer bracket member 30 includes a generally planar bottom wall 32 shown being generally circular in shape. Circular recess 34 is formed in the lower surface of bottom wall 32 and is sized and shaped to accommodate bottom flange 72 of inner bracket member 70. Centrally disposed within recess 34 is a keyed opening 36 through which inner bracket member 70 inserts. In the shown embodiment, keyed opening 36 is generally triangular in shape with one of the triangle corners shortened to prevent inner bracket member 70 from being inserted at an improper rotational orientation. Alternatively shaped keyed openings could also be employed provided corresponding changes to the configuration of inner bracket member 70 occur.

Upwardly extending from the radial periphery of bottom wall 32 is shield 38, which is bowed outwardly. Housing 40, which defines a cavity in which a spring of a locking pin is held captive, also is formed on bottom wall 32. Radially aligned ribs between the sides of shield 38 and bottom wall 32 may be provided to increase the bracket member rigidity without introducing significant extra material costs or weight. Shield 38 is particularly shaped in conjunction with the headliner 17 or vehicle roof panel to which visor mounting bracket assembly 25 is installed such that around its entire circumference shield upper edge 39 is flush with headliner 17 when outer bracket member 30 is mounted.

Outer bracket member 30 also includes a set of three upwardly extending locking fingers which are resiliently hingedly connected to bottom wall 32. As best shown in FIG. 2, locking fingers 43–45 are aligned in a one to one correspondence and flanking the three legs of triangular keyed opening 36. In the integral configuration shown, the plastic construction of fingers 43–45 furnishes them with sufficient resiliency to return from a radially inward deflected position shown in FIG. 3B to a latching position represented in shadow in FIG. 3B during bracket installation described further below.

The upper faces of locking fingers 43–45 each includes ramps 48–50 used for camming inner bracket member 70 upward into an assembled position. Locking bosses or catches 52–54 are integral with and project from the outwardly facing side surfaces of locking fingers 43–45 to positively engage the upper face of sheet metal panel 125 (See FIG. 3A) during installation of outer bracket member 30. To account for the shown angling of panel 125 relative to visor mounting bracket assembly 25, locking boss 52 is oriented generally transverse to the alignment of its locking finger 43, and locking bosses 53 and 54 are angled relative to the alignments of their respective locking fingers 44 and 45. It will be appreciated that in order to positively engage alternately contoured panels or headliners, or to engage apertures in addition to the single, central keyed aperture shown, locking bosses 52–54 could be otherwise configured.

Referring to FIG. 3A, shown in a disassembled state are locking pin 60 and compression spring 63, which are one possible set of components for positively preventing relative rotation between inner bracket member 70 and outer bracket member 30 when assembly 25 is operationally assembled. Spring 63 inserts within the cavity defined by housing 40, and locking pin 60 caps the lower spring end and projects into recess 34. Radially projecting ears 61 of pin 60, which may engage notches or slots formed in the inner walls of housing 40, prevent pin 60 and spring 63 from falling out of housing 40 when assembled.

Rather than the integral formation shown, locking fingers 43–45 could alternatively be formed as part of an insert which is connectable to the remainder of outer mounting bracket 30. Suitable methods of connection may include a latching engagement as well as other ways well known in the art. This insert type construction is envisioned advantageously providing the remainder of the shown mounting bracket assembly components with the flexibility to be employed with vehicles having differently configured headliners and the like. In particular, utilization of interchangeable inserts allows the angle and position at which locking fingers 43–45 are disposed relative to outer mounting bracket bottom wall 32 to be adjusted without requiring that differently constructed inner bracket members 70 or elbows 100 be furnished. As a result, by merely changing the insert containing the locking fingers, sunshade 15 may be disposed at different angles relative to outer mounting bracket 30, which may be desired as dictated by the shape of the vehicle to which mounting bracket assembly 25 is operationally installed.

Referring now to FIGS. 2–6, inner bracket member 70 is preferably molded in one-piece from a resilient, flexible material such as Acetal plastic. This construction affords prongs 83–85 suitable flexibility to be compressed into a tightened engagement with elbow 100 during camming rotation of assembly described below. Bottom annular flange 72 includes semi-circular notch 74 along its radial periphery and a cylindrical axial bore 75 formed therethrough. An arcuate travel stop 76 having opposite end faces 77, 78 ring bore 75 along the lower face of flange 72. Travel stop 76 rings approximately 180° of bore 75 to provide the desired operational range of rotation for elbow 100.

Tubular body 80 of inner bracket member 70 extends upwardly from flange 72 and terminates with upstanding prongs 83–85 defined by longitudinally extending slots therebetween. The hollow interior of tubular body 80 forms the upper volume of axial bore 75 and is generally frustoconical in shape. The hollow interior tapers upwardly and ends at a ledge 87 (See FIG. 4) disposed on and jutting inwardly from each prong 83–85. Camming lugs 90–92 situated proximate the top of prongs 83–85 are generally rounded tetrahedral projections in shape and protrude radially outwardly. Camming lugs 90–92 can be increased or decreased in size to achieve proper rotational effort of visor swing torque. In other words, the camming lugs can be increased or decreased in size to regulate the frictional force between the inner bracket and elbow. As best shown in FIG. 2, lugs 90–92 together define a body upper periphery which is generally triangular in outlined shape. In order for prongs 90–92 to be insertably received through keyed opening 36, which includes a shortened corner, lug 90 lacks an outermost tip present in lugs 91 and 92.

Figure 6:
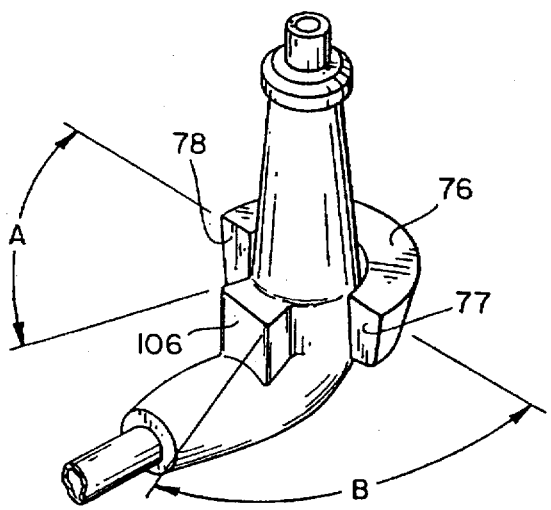
FIG. 6 is a perspective view of the elbow of the assembly of FIG. 1 with the travel stop of the inner bracket member abstractly shown.

As shown in FIGS. 2 and 6, elbow 100 is generally molded in one piece from Nylon in an L-shape form that includes a horizontal leg portion 102 and a vertical leg portion 104. The approximately 90° bend shown is merely exemplary, as other angles may be employed in some situations to properly locate sunshades in their respective vehicles. Elbow vertical leg portion 104, which tapers upwardly to closely correspond in size and shape to the interior hollow of inner bracket member body 80, is integrally formed with a radially extending stop block 106 at its lower end and an annular ridge 108 at its top end. In the shown embodiment, visor shaft 21 is also L-shaped and encased within both leg portions 102 and 104. Visor shaft 21 reinforces the plastic construction of elbow 100 and may serve as a conduit through which electrical current to potential visor accessories is circuited.

To connect elbow 100 to inner bracket member 70, elbow vertical leg portion 104 slidably inserts in an axial direction through bore 75 and into the interior hollow of body 80 until annular ridge 108 encounters ledges 87 of prongs 83–85. Provided sufficient axial force is applied to elbow 100, prongs 83–85 are biased outwardly allowing annular ridge 108 to slide past ledges 87, at which time prongs 83–85 resiliently snap back to their static position to effectively maintain elbow 100 therein as shown in FIG. 4. Elbow 100 is free to rotate about its axis of insertion relative to inner bracket member 70 provided torque or effort sufficient to overcome a first frictional resistance is applied. When so connected, stop block 106 is elevationally aligned with travel stop 76 of inner bracket member 70, which is abstractly represented in FIG. 6. In this embodiment, stop block 106 spans an arc of about 60°, thereby allowing elbow 100 to be rotated about 120°, i.e. the arc spanned by angles A and B, without stop block 106 abutting either of travel stop ends 77 and 78. It will be appreciated that stop block 106 and travel stop 76 cooperate to define the arcuate length of the visor travel path.

Figure 7A:
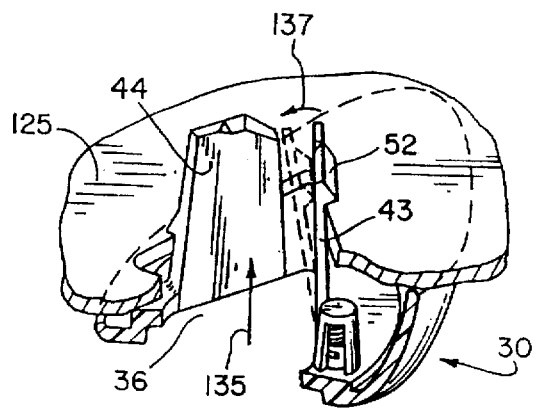
FIGS. 7A–7C are a series of partial sectional perspective views of the assembly of FIG. 1 during its installation to the apertured vehicle panel.
Figure 7B:
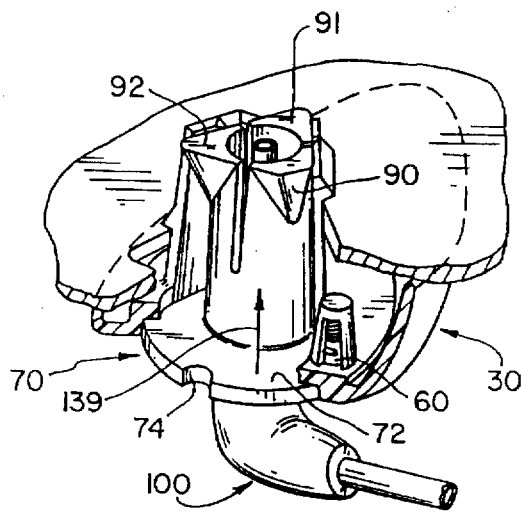
Figure 7C:
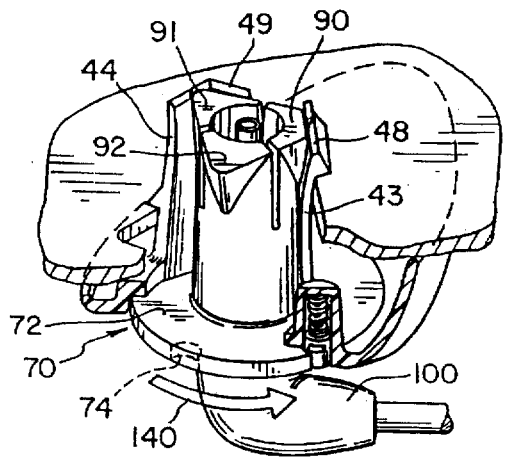
Figure 8A:
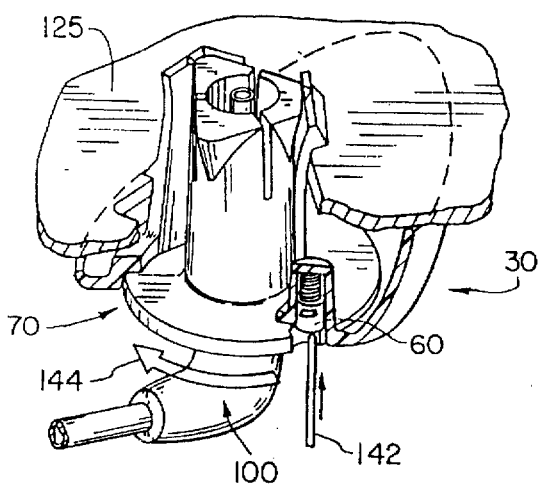
FIGS. 8A and 8B are a series of partial sectional perspective views of the assembly of FIG. 1 during its partial removal from the vehicle.
Figure 8B:
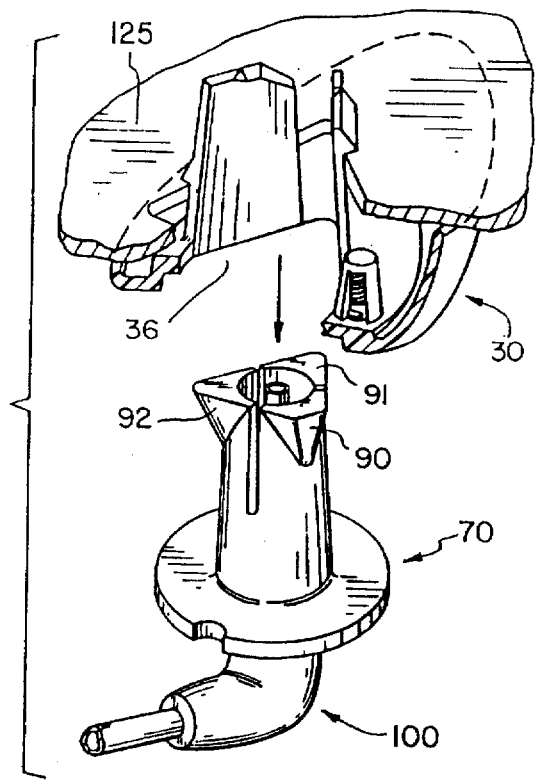

The structure of visor mounting bracket assembly 25 will be further understood in view of the following description of its installation, with reference to FIGS. 7A–7C, and its removal, with reference to FIGS. 8A and 8B. The manner in which the various components of visor mounting bracket assembly 25 are installed is not intended to be limited by the following description. While explained herein mounting a headliner directly to a roof, as explained above assembly 25 can be attached to a modular headliner and subsequently incorporated into a vehicle. Moreover, the various components of assembly 25 can be installed at various points of manufacture, as mounting bracket 30 can be used to fasten headliner 17 to panel 125 while separate from the remainder of the assembly components, which can be subsequently installed to the vehicle panel at a later stage of manufacture if desired. It will be appreciated that the present inventive assembly may advantageously serve as part of the fastening system for the headliner.

As shown in FIG. 7A, outer bracket member 30 is initially attached to panel 125, sandwiching the not shown headliner therebetween. In particular, with outer bracket member 30 rotationally oriented such that locking fingers 43–45 are aligned with the legs of the keyed panel aperture 127, outer bracket member 30 is moved upwardly in the direction indicated by arrow 135. Due to the isosceles shape of keyed aperture 127, outer bracket member 30 can only be readily inserted in a proper operational orientation. During this upward insertion, the ramped upper faces of locking bosses 52–54 encounter the inner surface 131 of panel 125, which causes locking fingers 43–45 to be bent radially inwardly. This bending is abstractly represented in FIG. 7A by the shadowed locking finger, which is shifted in the direction indicated by arrow 137. As outer bracket member 30 continues to be forced upwardly, the tips of the locking bosses eventually pass outer surface 130 of panel 125. Due to their resilient construction, locking fingers 43–45 then snap outwardly, in the direction indicated by arrow 138 and to the position shown in shadow in FIG. 3B, to a securing position latchably engaging panel 125. The height of locking bosses 52–54 and their angular orientation relative to shield 38 are selected such that shield upper edge 39 snugly presses headliner 17 against panel 125 as shown in FIG. 3A. The ramped lower faces of locking bosses 52–54 also account for expected tolerance variations in the actual thickness of panel 125.

Referring now to FIG. 7B, inner bracket member 70 and elbow 100 are shown as a subassembly being installed to mounted outer bracket member 30. This subassembly is achieved by the securing of elbow ridge 108 within inner bracket member prongs 83–85 in the above-described manner. Insertion of the subassembly commences by rotationally orienting inner bracket member 70 such that lugs 90–92 are properly oriented so as to be insertable into keyed opening 36. Orientation may be aided by arrows molded into the parts. The subassembly is then slid upwardly in the direction indicated by arrow 139 until bottom flange 72 substantially resides within bottom wall recess 34 as shown. During this insertion, locking pin 60 engages the upper annular face of bottom flange 72 and is forced upwardly against the returning force of spring 63. At this stage of installation, in this embodiment flange notch 74 is removed from locking pin 60 by an angular distance of approximately 60°, and the subassembly is freely removable from within the space defined by locking fingers 43–45. In situations wherein it may be desirable for the subassembly to be temporarily retained within outer mounting bracket 30, inwardly protruding ribs on the locking fingers which loosely engage camming lugs 90–92 of inner bracket member body 80 may be provided.

Inner bracket member 70 is releasably secured to outer member 30, and thereby to panel 125 as well, in a manner represented in FIG. 7C. As an installer rotates elbow 100 in the direction indicated by arrow 140, elbow 100 freely rotates relative to inner bracket member 70 until stop block 106 abuts end 77 of inner bracket member travel stop 76. Additional rotation of elbow 100 results in inner bracket member 70 simultaneously rotating therewith and relative to fixed outer bracket member 30. During this rotation, camming lugs 90–92 of body prongs 83–85 engage or ramp up camming ramps 48–50 of locking fingers 43–45, drawing inner bracket member 70 fully upward to ensure bottom flange 72 is flush with bottom wall 32 of outer bracket member 30. During this further rotation, prongs 83–85, and more particularly the tetrahedral shaped outer radial portions of camming lugs 90–92, encounter locking fingers 43–45. Due to their resilient character, prongs 83–85 are compressed radially inward during camming, and locking fingers 43–45 will also experience a slight radially outward bending as shown in order to create a spring force which helps to stabilize final installation. Due to their ability to decrease in width, the longitudinal slots between adjacent prongs permits this compression of prongs 83–85. As prongs 83–85 are pressed inwardly, their inner surfaces squeeze or compress vertical leg 104 and annular ridge 108 of elbow 100 to provide a generally horizontal force on elbow 100. This compressing action or horizontal force creates a tighter frictional engagement between the elbow and inner bracket member. Consequently, the effort or torque required to subsequently rotate elbow 100 within inner bracket member 70 is increased from the effort required before the camming. The effort increasing is desirable from a standpoint of achieving a more significant effort for movement of the sunshade assembly 15 from a forward position adjacent windshield 18 to a lateral position adjacent side window 19.

Inner bracket member 70 continues to rotate with elbow 100 until semi-circular notch 74 rotates from the shadowed position shown in FIG. 7C to the illustrated locking position directly below pin 60. Spring 63 biases pin 60 outwardly to positively lock bottom flange 72 therewith to prevent further rotation of inner bracket member 70 relative to outer bracket member 30. Visor mounting bracket assembly 25 is now operationally installed. While elbow 100 cannot be further rotated in direction 140 due to the engagement with travel stop 76, elbow 100 can be rotated relative to inner bracket member 70 counter to direction 140. It will be appreciated that the visor mounting bracket assembly 25 facilitates installation as no powered or hand tools or fasteners are required in this installation and as assembly 25 can be referring an expeditious fashion.

Referring now to FIGS. 8A and 8B, removal of visor mounting bracket assembly 25 proceed as follows. Initially, while locking pin 60 is forced upward against the returning force of spring 63, for example with the use of narrow instrument 142 shown in FIG. 8A, elbow 100 is rotated relative to inner bracket member 70 in a clockwise direction indicated by arrow 144. During elbow rotation, stop block 106 engages end 78 of travel stop 76, which causes inner bracket member 70 to begin to rotate with elbow 100. After inner bracket member 70 rotates through a preselected angular arc, which for the shown embodiment is approximately 60°, camming lugs 90–92 will again be properly oriented with keyed opening 36 to allow withdrawal of the inner bracket member/elbow subassembly as shown in FIG. 8B.

Rather than locating travel stop 76 on the bottom surface of inner bracket member flange 72, a conceptually similar travel stop can be provided within the internal hollow of body 80 provided a cooperating stop block is fashioned at an appropriate elevation on vertical leg 104 of inserted elbow 100.

A second embodiment of the invention is shown in FIGS. 9–14 and is in many respects similar to the embodiment of FIG. 1. Referring now to the substantially exploded view of FIG. 9, the second embodiment of the visor mounting bracket assembly includes outer bracket member 160, inner bracket member 210, and elbow 250. The apertured panel 275 to which the assembly may be attached is described further as a portion of the sheet metal roof, but in the case of off-line modular assembly may be a rigid backing plate against which an interposed headliner is maintained. Panel 275 includes outer surface 280 and an inner surface 281. Panel 275 includes a keyed aperture formed by a generally triangular base aperture 277 and a rectangular slot 278 extending from base aperture 277. Slot 278 receives anti-rotation pin or tower 176 and ensures a proper insertion alignment of outer bracket member 160 relative to apertured panel 275. The headliner intended to cover underside surface 281 of panel 275 is not separately shown in FIG. 9.

Referring now to FIGS. 9 and 10, outer bracket member 160 is integrally molded from a resilient plastic with a generally planar, circular bottom wall 162. A circular recess (not shown) formed in the lower surface of bottom wall 162 is sized and shaped to accommodate bottom flange 212 of inner bracket member 210. Passing through the central portion of bottom wall 162 is keyed opening 164 through which the prongs of inner bracket member 210 insert. Keyed opening 164 allows inner bracket member 210 to be installed in only one orientation. Keyed opening 164 is generally triangular in shape but includes a non-symmetry to prevent an improper rotational orientation of inner bracket member 210 during its insertion. Alternatively shaped keyed openings and cooperating inner bracket members 210 may also be employed.

Upwardly extending from the radial periphery of bottom wall 162 is outwardly bowed shield 166, which is shaped complementary to panel 275 such that shield upper edge 167 presses an interposed headliner against panel underside surface 281 when outer bracket member 160 is mounted. Anti-rotation pin 176 is also integrally formed with and upwardly extends from bottom wall 162.

Formed into bottom wall 162 is flex arm 170, which includes a downwardly projecting nub 172 (See FIG. 11) at its distal end. The plastic construction of bracket member 160 provides flex arm 170 with sufficient resilience to return from a biased upward position experienced during bracket assembly installation to a locking position coplanar with bottom wall 162. The biased upward position and locking position are respectively shown in dashed and solid lines in FIG. 11.

Outer bracket member 160 also includes three upwardly extending locking fingers which are resiliently hingedly connected to bottom wall 162. Locking fingers 180–182 are aligned in a one to one correspondence and flanking the legs of keyed opening 164. The resilient construction of fingers 180–182 affords sufficient resiliency to return from a radially inward deflected position experienced during bracket mounting to a radially outward latching position. The upper faces of locking fingers 180–182 include ramps 184–186 used for camming inner bracket member 210 upward into an assembled position. Locking bosses or catches 188–190 are integral with and project from the outwardly facing side surfaces of locking fingers 180–182 to positively engage or snap over the upper surface 280 of panel 275 during installation of outer bracket member 160. In order to positively engage alternately contoured panels, or to engage apertures in addition to the single, base aperture 277 shown, locking bosses 188–190 could be otherwise configured. Vertical slots 192 positioned in the radially outward base portions of locking fingers 180–182 extend downward through bottom wall 162 and open into the not shown underside recess. Slots 392 are sized to allow insertion of a tool such as a screwdriver used to individually force fingers 180–182 radially inward to allow removal of outer bracket member 160 from panel 275. As described with reference to the embodiment of FIG. 1, locking fingers 180–182 could alternatively be formed as part of an insert which is connectable to the remainder of outer mounting bracket 160.

Figure 12:
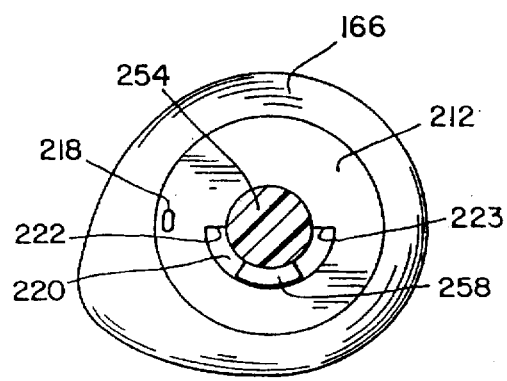
FIG. 12 is a cross-sectional view along line 12—12 of FIG. 14A of the mounting bracket assembly of FIG. 9.

Referring now to FIGS. 9 and 12, inner bracket member 210 is molded from a resilient, flexible plastic that affords prongs 214–216 suitable flexibility to be compressed into a tightened engagement with elbow 250 during camming rotation of member 210 during assembly. Bottom annular flange 212 includes a hole 218 therethrough which cooperates with nub 172 of flex arm 170 to lock inner bracket member 210 to outer bracket member 160. An arcuate slot 220 of around 180° formed in annular flange 212 flanks a central bore into which axially inserts elbow 250, which is shown in cross-section in FIG. 12. Radially aligned end faces 222, 223 of arcuate slot 220 serve as stops for elbow stop tab 258 to provide the desired operational range of rotation for the elbow.

Tubular body 225 of inner bracket member 210 extends upwardly from flange 212 and terminates with upstanding prongs 214–216 defined by longitudinally extending slots therebetween. The hollow interior of tubular body 225 is generally a frustoconical axial bore. The hollow interior tapers upwardly and ends at a ledge 227 disposed on and jutting inwardly from each prong 214–216. Camming lugs 230–232 situated proximate the top of prongs 214–216 protrude radially outwardly. Lugs 230–232 together define a body upper periphery which is particularly shaped to insert through keyed opening 164. Lugs are also used to regulate efforts.

As shown in FIG. 9, elbow 250 is generally molded in an L-shape form that includes a horizontal leg portion 252 and a vertical leg portion 254. Angles between leg portions 252 and 254 other than the approximately 90° angle shown may be provided. At its upper end, elbow vertical leg portion 254 tapers upwardly to closely correspond in size and shape to the interior hollow of inner bracket member body 225. Annular ridge 256 if formed in vertical leg portion 254 at its top end. A radially extending stop block or tab 258 is formed along the middle region of vertical leg portion 254 at a height which results in tab 258 residing within arcuate slot 220 when annular ridge 256 is supported by inner bracket member ledges 227. A visor shaft which may be encased or otherwise attached to elbow 250 is not shown.

To connect elbow 250 to inner bracket member 210, elbow vertical leg portion 254 is slidably inserted in the axial direction into the interior hollow of body 225 until annular ridge 256 encounters ledges 227 of prongs 214–216. Provided sufficient axial force is applied to elbow 250, prongs 214–216 are biased outward allowing annular ridge 256 to slide past ledges 227, at which time prongs 214–216 resiliently snap back to their static position to effectively maintain elbow 250 therein. Elbow 250 may be rotated relative to inner bracket member 210 provided torque or effort is applied which is sufficient to overcome the frictional resistance that then exists. As with the embodiment of FIG. 1, stop tab 258 spans an arc of about 60°, thereby allowing elbow 250 to be rotated about 120° before stop tab 258 abuts either of end faces 222, 223.

Figure 13C:
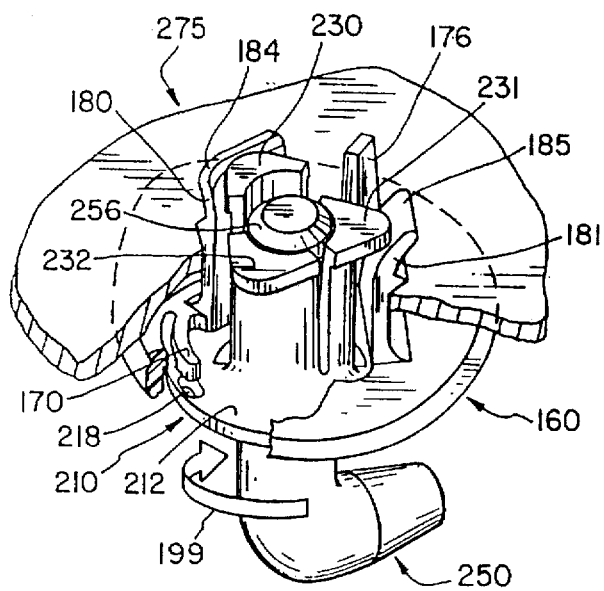
Figure 11:
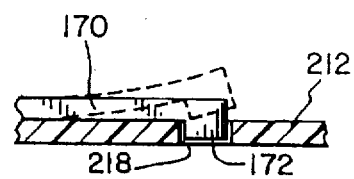
FIG. 11 is a diagrammatic fragmentary view of a locking flex arm of the outer bracket member and its locking engagement with the inner bracket member.
Figure 14A:
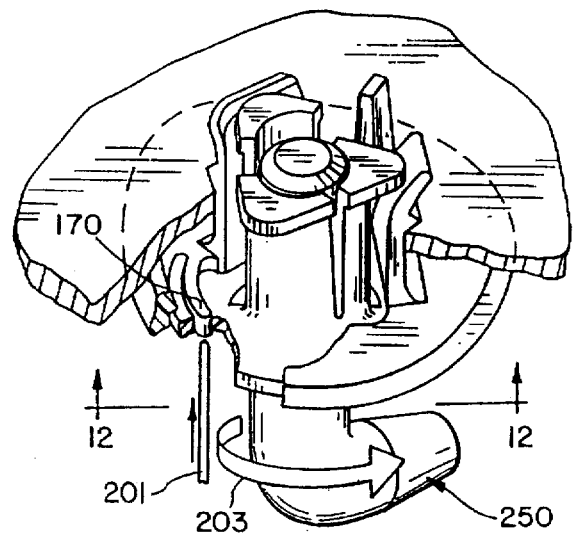
FIGS. 14A and 14B are a series of partial sectional perspective views of the bracket assembly of FIG. 9 during its partial removal from the panel.
Figure 14B:
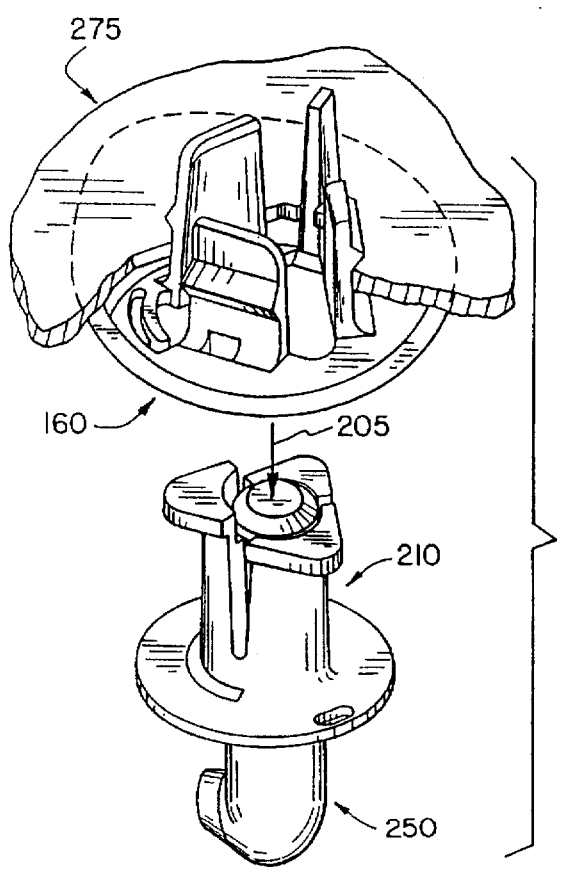

The structure of the visor mounting bracket assembly of FIG. 9 will be further understood in view of the following description of a method of its installation, with reference to FIGS. 13A–13C, and its removal, with reference to FIGS. 14A and 14B.

As shown in FIG. 13A, outer bracket member 160 is initially attached to panel 275. In particular, with outer bracket member 160 rotationally oriented such that anti-rotation tower 176 is aligned with rectangular slot 278 and such that locking fingers 180–182 are aligned with base aperture 277, outer bracket member 160 is moved upwardly in the direction indicated by arrow 195. During this upward insertion, the ramped upper faces of locking bosses 188–190 encounter the inner surface 281 of panel 275, which causes locking fingers 180–182 to be bent radially inward. As outer bracket member 160 continues to be forced upwardly, the tips of the locking bosses eventually pass outer surface 280 of panel 275, and locking fingers 180–182 then snap outwardly to a securing position latchably engaging panel 275.

Referring now to FIG. 13B, after outer bracket member 160 is mounted, a subassembly of bracket member 210 and elbow 250 are installed. Insertion of the subassembly commences by rotationally orienting inner bracket member 210, preferably with the aid of indicia provided on the components, such that lugs 230–232 are properly oriented so as to be insertable into keyed opening 164. The subassembly is then slid in the axial direction indicated by arrow 197 until annular flange 212 enters the recess on the underside of bottom wall 162. During this insertion, flex arm nub 172 contacts the upper face of flange 212 and is biased upward. At this stage of installation, the subassembly is freely removable in an axial direction from within outer bracket member 160.

Inner bracket member 210 is then releasably secured to outer bracket member 160, and thereby to panel 275, in a manner represented in FIG. 13C. As an installer rotates elbow 250 in the direction indicated by arrow 199, elbow 250 rotates relative to inner bracket member 210 until stop tab 258 abuts arcuate slot end face 223. Additional rotation of elbow 250 cause inner bracket member 210 to simultaneously rotate therewith and relative to outer bracket member 160, which is rotationally fixed by anti-rotation tower 176. During this rotation, camming lugs 230–232 of body prongs 214–216 ramp up camming ramps 184–186 of locking fingers 180–182, drawing inner bracket member 210 fully upward to ensure bottom flange 212 is flush with bottom wall 162. During this further rotation, the outer radial portions of camming lugs 230–232 encounter locking fingers 180–182. Due to their resilient character, prongs 214–216 are compressed radially inward during camming, and locking fingers 180–182 may also experience a slight radially outward bending as shown. As prongs 180–182 are pressed inwardly, their inner surfaces compress vertical leg 254 and annular ridge 256 of elbow 250, thereby providing a force transverse to the axis about which elbow 250 is inserted and rotated. This compressing force translates to an increased frictional force or rotational effort for the mounting bracket assembly. It will be appreciated that when elbow 250 is axially inserted vertically into the mounting bracket, the forces on the elbow creating the higher frictional effort are horizontally oriented.

Inner bracket member 210 continues to rotate with elbow 250 until hole 218 rotates under flex arm hub 172, at which point flex arm 170 biases nub 172 downward to positively lock flange 212 and thereby prevent further rotation of inner bracket member 210 relative to outer bracket member 160. The visor mounting bracket assembly is now operationally installed. It will be appreciated that the direction in which the elbow and inner bracket subassembly were rotated to achieve installation is opposite to the direction for the embodiment of FIG. 1 due to the embodiment of FIG. 9 being suited for a passenger side visor.

Referring now to FIGS. 14A and 14B, removal of the visor mounting bracket assembly begins by first forcing flex arm 170 upward by inserting instrument 201 into hole 218 and simultaneously rotating elbow 250 in the direction indicated by arrow 203. During elbow rotation, stop tab 258 engages end face 222 and causes inner bracket member 210 to rotate with elbow 250. After inner bracket member 210 rotates through a preselected angular arc, camming lugs 230–232 will again be properly oriented with keyed opening 164 to allow withdrawal in axial direction 205 of inner bracket member/elbow subassembly as shown in FIG. 14B.

Figure 15:
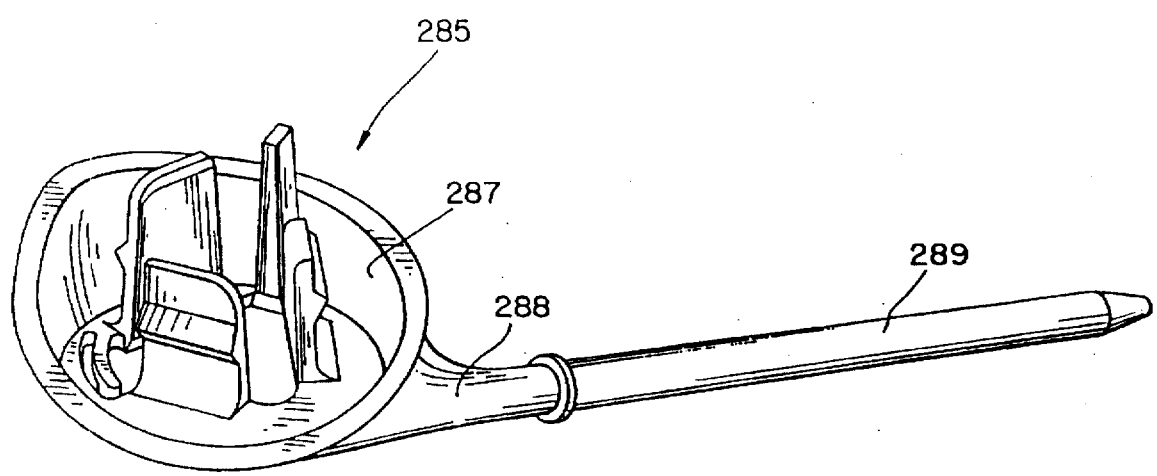
FIG. 15 is a perspective view of an outer bracket member of another embodiment of the present invention which includes an auxiliary visor bar.

Referring to FIG. 15, there is shown an alternate embodiment of an outer bracket member, generally designated 285. Outer bracket member 285 differs from outer bracket member 160 of the embodiment of FIG. 9 in that its shield 287 is integrally formed with an extension 288 that continues as an auxiliary visor arm 289 which extends parallel to the front windshield when the bracket assembly is installed. Thus, bracket member 285 is integral with visor arm 289. A auxiliary visor blade (not shown) may be attached to visor arm 289 and may be rotated down to cover the top portion of the windshield when the primary visor blade has been swung to cover the side window.

It will be appreciated that the foregoing is presented by way of illustration only, and not by way of any limitation, and that various alternatives and modifications may be made to the illustrated embodiment without departing from the spirit and scope of the invention.

What is claimed is:

1. A method of attaching a sunshade to a vehicle comprising the steps of:

providing an apertured panel;

providing a mounting bracket assembly including an outer bracket, an inner bracket, and an elbow connectable with the sunshade, said outer bracket including means for attachment to the apertured panel and an inner bracket receiving opening, said inner bracket including a plurality of resilient locking prongs defining at least a portion of an elbow receiving interior hollow;

attaching said outer bracket to said apertured panel;

inserting said elbow into said elbow receiving interior hollow;

inserting said resilient locking prongs into said inner bracket receiving opening of said attached outer bracket; and after insertion into said receiving opening, axially rotating said resilient locking prongs relative to said outer bracket from a first rotational orientation to a second rotational orientation, wherein during rotation said resilient locking prongs engage a portion of said outer bracket to be compressed radially inwardly thereby so as to compress said elbow between said prongs such that rotation of said elbow relative to said inner bracket is frictionally resisted.

2. The method of claim 1 wherein said inner bracket and said outer bracket further comprise cooperating means for locking said inner bracket to said outer bracket, wherein said inner bracket locking means automatically engages said outer bracket locking means during said prongs rotating step when said prongs reach said second rotational orientation.

3. The method of claim 2 wherein said outer bracket locking means comprises a resilient flex arm.

4. The method of claim 1 wherein said inner bracket comprises a travel stop means, wherein said elbow comprises a stop block engagable with said travel stop means, and wherein said prongs rotating step comprises rotating said elbow relative to said inner bracket until said stop block abuts said travel stop means and then continuing rotating said elbow while said stop block engages said travel stop means such that said inner bracket rotates therewith.

5. The method of claim 1 wherein said attachment means comprises a plurality of resilient locking fingers insertable into one aperture of said panel and latchable with said panel for attaching said outer bracket to said panel.

6. The method of claim 1 wherein the apertured panel comprises a rigid backing plate, and wherein the method further comprises the steps of providing an apertured vehicle panel, and attaching said outer bracket to said apertured vehicle panel after the step of attaching said outer bracket to said backing plate.

\* \* \* \* \*